Patented Mar. 20, 1934

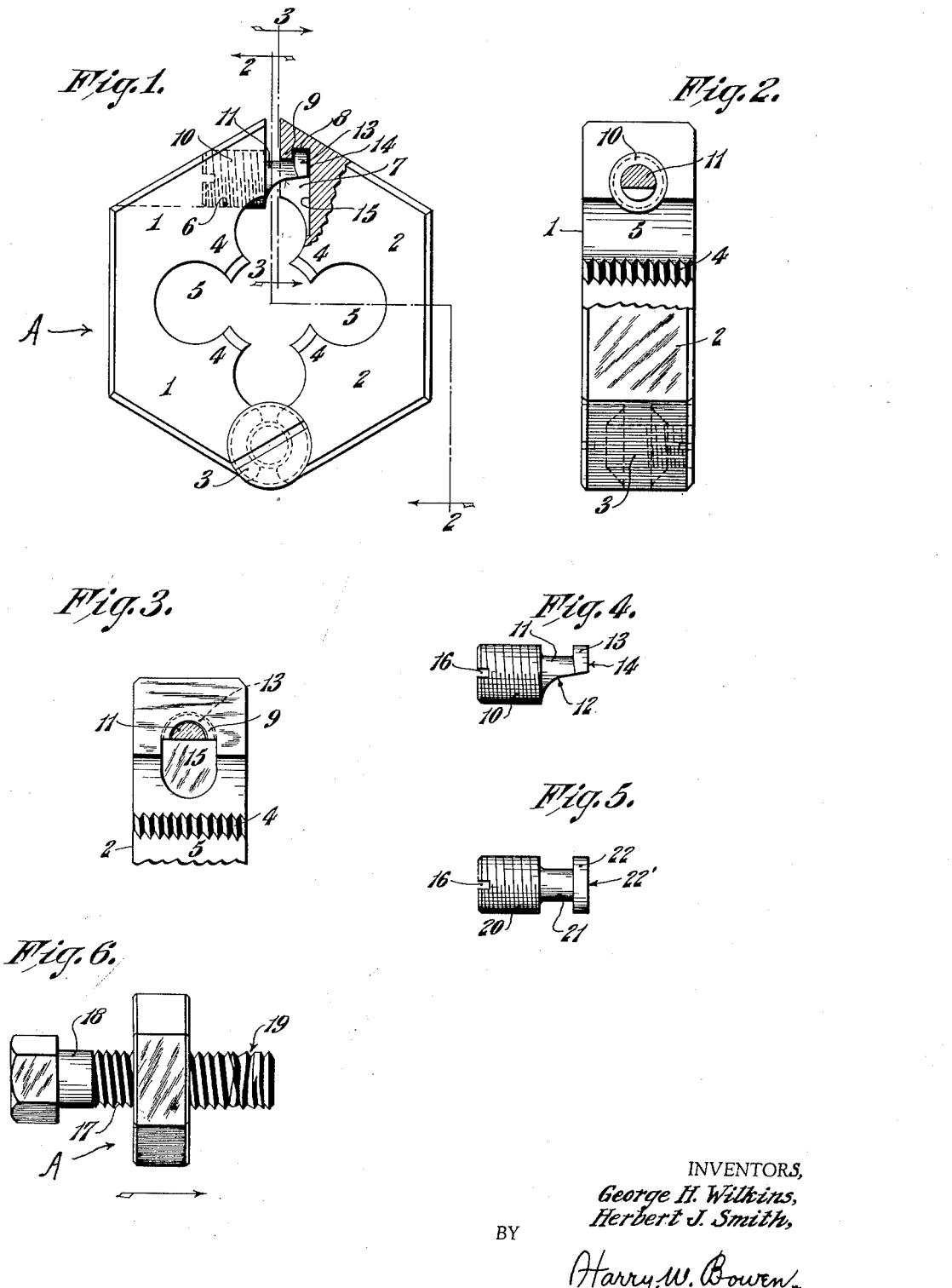
March 20, 1934.  H. J. SMITH ET AL  1,951,581
SELF CONTAINED OPENING DIE
Filed Nov. 9, 1932
INVENTORS,
George H. Wilkins,
Herbert J. Smith,
BY Harry W. Bowen
ATTORNEY.

1,951,581

UNITED STATES PATENT OFFICE 1,951,581

SELF-CONTAINED OPENING DIE

Herbert J. Smith and George H. Wilkins, Greenfield, Mass., assignors to Maurice J. Levy, trustee, Greenfield, Mass.

Application November 9, 1932, Serial No. 641,838

6 Claims. (Cl. 10—116)

This invention relates to improvements in a self-contained opening die.

An object of the invention is to provide a thread cutting die that may be readily opened, closed, and adjusted with a locking and releasing device.

A further object is to provide a re-thread ng and screw cutting die that may be readily opened for placing it onto a thread to be re-cut, or re-chased, and also adjusted for cutting a thread of the desired diameter on a new piece of work.

A further object and advantage of the present die is to permit it to be readily opened and removed, after a long thread has been cut, without the necessity of "backing-off", as must be done with a non-opening die, whereby saving of time, in completing the thread will be greatly effected.

A further object is to provide a die, that may be readily opened, or released, and placed on the perfect threaded portion of a bolt, or stud, for re-cutting the threads on the end of a bolt, or stud, that has been battered, or jammed, or, in other words, to re-chase the end threads, in order to permit the starting of a new nut. If the threads are jammed on the end of a bolt, or stud, it would be practically impossible to start the die, and even if the die was started, the perfect threaded portion would probably be re-cut by the die, which would render the bolt useless.

The present die, which is preferably hexagonal in shape, permits an ordinary wrench to be used for turning the die for re-chasing the threads of a bolt, or stud, without the use of a die holding stock. We may, of course, employ a die which is square or octagonal in shape.

Broadly, our invention comprises a two-part hexagonal die, the members of which are pivotally connected together to permit the opening and closing of the same. The opposite side of the die members are provided with a locking and releasing device for readily connecting them together, for adjusting the distance between the threads, and to permit their being separated, when the said device is turned through a half revolution, as will be explained. This connecting and adjusting device, or means, comprises a threaded opening in one of the members, a recessed portion in the opposite member that is formed with an overhanging lip. Located within the threaded opening of one of the members is a threaded member that is formed with a neck portion, a flange or head portion, which, when the head member is turned through 180°, is located under the overhanging lip of the recessed portion, whereby the members of the die will be retained against opening, after once being adjusted. This threaded member serves as an adjusting element for the die members.

Referring to the drawing:—

Fig. 1 is an elevational view showing the two members of the die, in their operative, or closed position, one of the members being partially broken away, to illustrate the locking and releasing device.

Fig. 2 is a partial sectional view on the line 2—2 of Fig. 1, showing the recessed portion in one of the members and the shank of the adjusting screw in section.

Fig. 3 is a detail sectional view on the line 3—3 of Fig. 1, showing the detailed construction of the recess in one of the movable members, the adjusting screw in the recess, and in section.

Fig. 4 is a detail view of the adjusting and locking screw removed from the die.

Fig. 5 is a detail view of a modified adjusting screw and locking device, and

Fig. 6 illustrates the use of our two-part opening die on the perfect threads of a bolt and the end threads of which have been battered, or jammed, which are to be re-cut by backing off the die.

Referring to the drawing in detail:

1 and 2 designate the two members of the die, which are hinged together by any suitable means, indicated at 3. The die, as a whole, is indicated by the letter A. The lands, or thread-cutting elements, of the die members are indicated at 4 and the usual clearance recesses for chips at 5. Opposite the pivot connection 3, the member 1 is formed with a threaded opening 6 and the member 2, with the recessed portion 7. This recessed portion is formed with the under cut part 8 and the overhanging lip portion 9, which is 180° in extent. 10 indicates the adjusting screw, which is threaded into the opening 6 of the member 1. This adjusting screw is formed with the narrow neck portion 11, which is cut away, or reduced, as indicated at 12. 13 indicates the head portion, which is a semi-circular disk. When the adjusting screw is threaded into the opening 6, its outer end 14 will engage the bottom 15 of the recess 7 in the member 2, which will serve to adjust the opening of the members 1 and 2, relative to each other. The neck 11 permits this adjustment. When the correct adjustment has been made, the head 13 is turned under the overhanging lip 9, thus locking the members of the die together. By reason of this construction, it will be seen, that by inserting a screw driver in the groove 16 and imparting a half revolution to the screw, the die members 1 and 2 may be readily opened for permitting the die to be placed onto the perfect threads 17 of the bolt 18 (see Fig. 6) then, the locking screw 10 is turned. When the hexagonal die is turned with a wrench, the jammed, or battered threads 19, may be re-cut, as readily understood, for permitting a nut to be placed on the end.

In the case of a non-opening die, it would be impossible to thread the die onto the battered, or jammed, threads 19. It would also spoil the perfect threads at 17, since they would be liable to a cross cutting, or misalignment.

Referring to Fig. 5, 20 indicates an adjusting screw having the neck portion 21, which is not reduced in diameter, or cut away, as shown in Fig. 4, but is left a complete circle. 22 indicates a full flange, or head portion, that is also complete and not cut away, as indicated at 13, in Fig. 4. This adjusting screw permits the two members of the die to be permanently secured together. It is, of course, obvious that the end 22' would engage the bottom, or surface 15, of the member 2, in making the accurate adjustment of the die.

From this description, it will be seen that we have perfected what may be termed a self-contained opening die that may be readily opened and closed, accurately adjusted and locked and one that may be operated with an ordinary wrench, without resorting to the use of a die stock.

What we claim is:—

1. An opening die comprising two members pivotally connected together, an adjusting and locking means for said members comprising a threaded opening in one member, a recessed portion in the other member having an overhanging lip portion, a threaded member engaging the threaded opening and having a part which is located under the overhanging lip portion of the other member, the said threaded member having a neck portion co-operating with the overhanging lip portion, and said part being cut away to permit the members of the die to be locked and unlocked when the threaded member is rotated a part revolution.

2. An opening die comprising two members pivotally connected together, locking and unlocking means for said members comprising a threaded opening in one member, a recessed portion in the other member having only a single overhanging lip portion, a locking member rotatably supported in the threaded opening and having a cutaway head part which is adapted to engage the underside of the overhanging lip portion of the other member when rotated through only a part revolution due to the cutaway head part.

3. A self-contained opening die having a plurality of sides comprising pivotally connected members, means for locking the members together but permitting them to be readily opened and closed comprising an opening in one member, the other member having a lipped recess, a member in the opening, said member having a flange part with a portion of the flange cut away to permit the remaining uncut portion to engage the lip of the recess when the member is turned through a part revolution.

4. A die having two members pivotally connected together, means for locking and unlocking, and adjusting the members comprising a threaded opening in one member, the other member having a recessed portion with a single overhanging lip part, substantially 180°, in extent a member in the threaded opening having a cutaway head portion and a reduced neck portion co-operating with the lip part, the head portion being located under the overhanging lip part when the member in the threaded opening is rotated through a part revolution and the neck portion serving to permit adjustment of the members of the die, before the head portion is brought to a stop under the said overhanging part.

5. An opening die comprising pivotally connected members, one of the members having a recessed portion, the other member having an opening, a member in the opening that is formed with a cutaway flanged head part and a reduced neck part adjacent the cutaway flanged head part, the recessed portion having a lip part with which the said flanged head part co-operates for locking the members of the die together when the member in the opening is rotated to bring the non-cutaway part of the flanged head part under the lip part and the bottom of the recess and the outer end of the said head co-operating to adjust the die members, the cutaway flanged head part permitting the die members to be readily opened and closed, and said reduced neck part co-operating with the lip part when the die members are adjusted.

6. A die having two members pivotally connected together, means for adjusting and retaining the members in their adjusted positions, comprising a threaded opening in one member, a threaded member in the threaded opening which is formed with a head portion that is substantially semi-circular in extent and a reduced or neck portion, the other member having a recess with an overhanging lip part under which the head portion of the threaded member is located when assembled, the outer end of the head portion engaging the bottom of the recess to effect the outer adjustment of the two members and the head and lip part co-acting to effect the inward adjustment of the two members when the threaded member is rotated, the reduced neck portion of the threaded member serving to receive an edge of the lip part, as described.

HERBERT J. SMITH.
GEORGE H. WILKINS.